United States Patent [19]

Miller

[11] Patent Number: 5,968,618
[45] Date of Patent: Oct. 19, 1999

[54] THERMAL COFFEE CARAFE

[76] Inventor: Blair J. Miller, 1903 S. Ruble St., Chicago, Ill. 60616

[21] Appl. No.: 09/059,136

[22] Filed: Apr. 13, 1998

[51] Int. Cl.$^6$ .............................. A47G 23/04; A47J 41/00
[52] U.S. Cl. ...................... 428/34.6; 428/34.7; 428/35.7; 222/475; 222/475.1; 222/183; 222/572; 215/13.1; 215/396; 215/398; 220/758
[58] Field of Search ................................... 428/35.7, 34.4, 428/34.6, 34.7; 222/475, 475.1, 183, 572; 215/13.1, 396, 398; 220/758, 759, 752

[56] References Cited

U.S. PATENT DOCUMENTS

| | | | |
|---|---|---|---|
| 1,435,199 | 11/1922 | Blair | 215/13.1 |
| 1,470,366 | 10/1923 | Johnson | 215/13.1 |
| 1,877,290 | 9/1932 | Forrest | 215/13.1 |
| 3,094,448 | 6/1963 | Cornelius | 215/13.1 |
| 3,356,243 | 12/1967 | Piker | 215/13.1 |
| 4,473,161 | 9/1984 | Zimmerman | 215/13.1 |
| 4,618,066 | 10/1986 | Vail | 215/13.1 |
| 4,718,566 | 1/1988 | Wunder | 215/13.1 |
| 4,721,214 | 1/1988 | Wandel | 222/572 |
| 4,879,146 | 11/1989 | Johnson | 422/35.7 |
| 4,984,707 | 1/1991 | Fierthaler | 215/13.1 |
| 5,108,808 | 4/1992 | Johnson | 428/35.7 |
| 5,215,794 | 6/1993 | Johnson | 222/475.1 |

*Primary Examiner*—Rena L. Dye
*Attorney, Agent, or Firm*—Jeffrey P. Calfa

[57] ABSTRACT

A thermal coffee carafe for maintaining the thermal energy of a fluid contained within the carafe. The carafe has a heat resistant outer shell capable of resting on a conventional coffee maker appliance's heat generation surface without any deformation. The outer shell is of a shape similar to the appliance's factory supplied carafe so that the carafe of this invention may fit on the heat generation surface of the appliance in place of the factory supplied carafe. The carafe also has an interior globe which only comes in contact with the outer shell at a top opening. The interior globe is the portion of the carafe that holds warm liquids such as coffee. The cavity between the outer shell and the interior globe provides insulation to the contained liquids. The cavity is evacuated to a lower pressure than atmospheric or contains an insulator such as an aerogel or partially contains an insulator and is evacuated adjacent to the insulator.

22 Claims, 2 Drawing Sheets

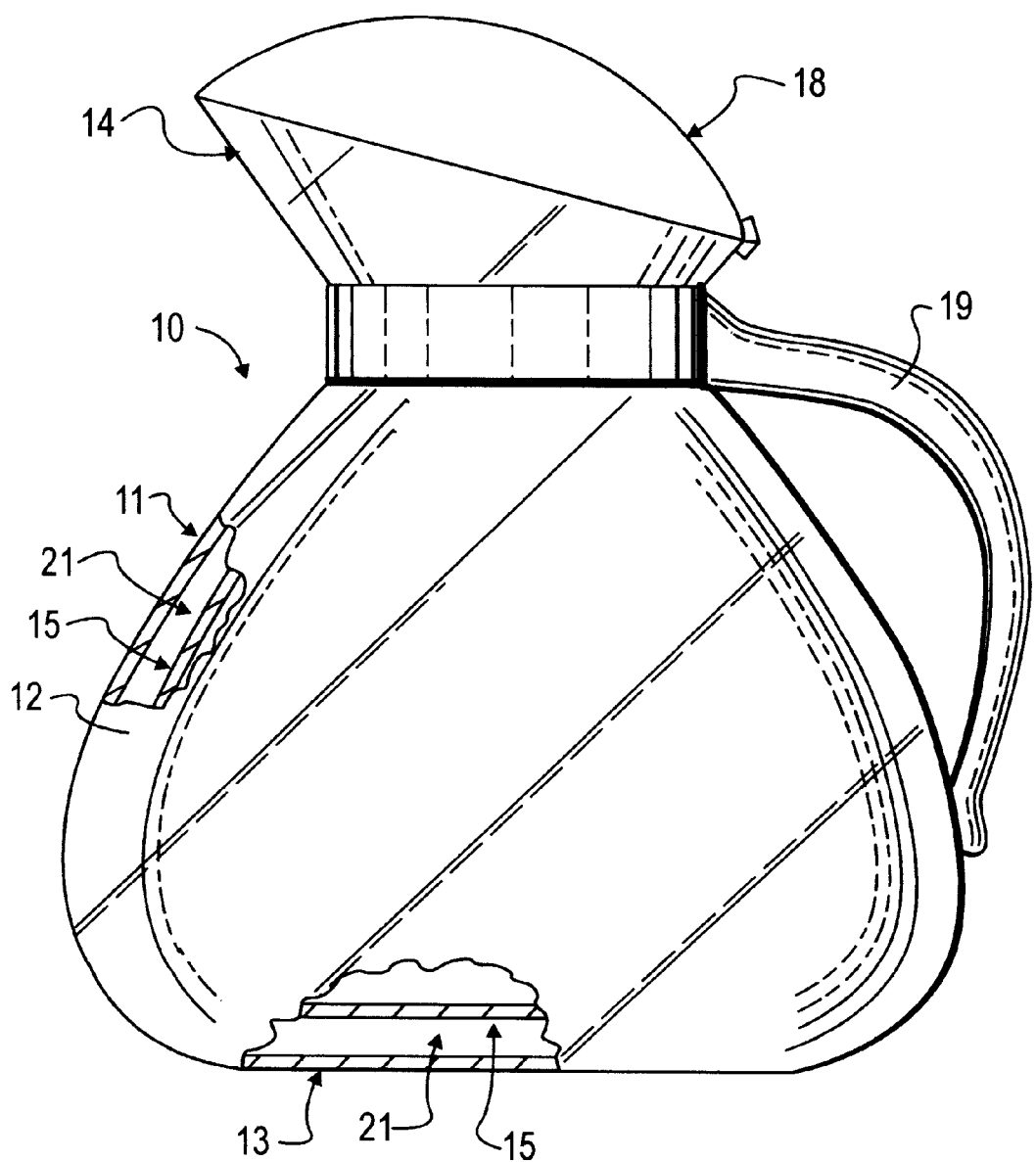

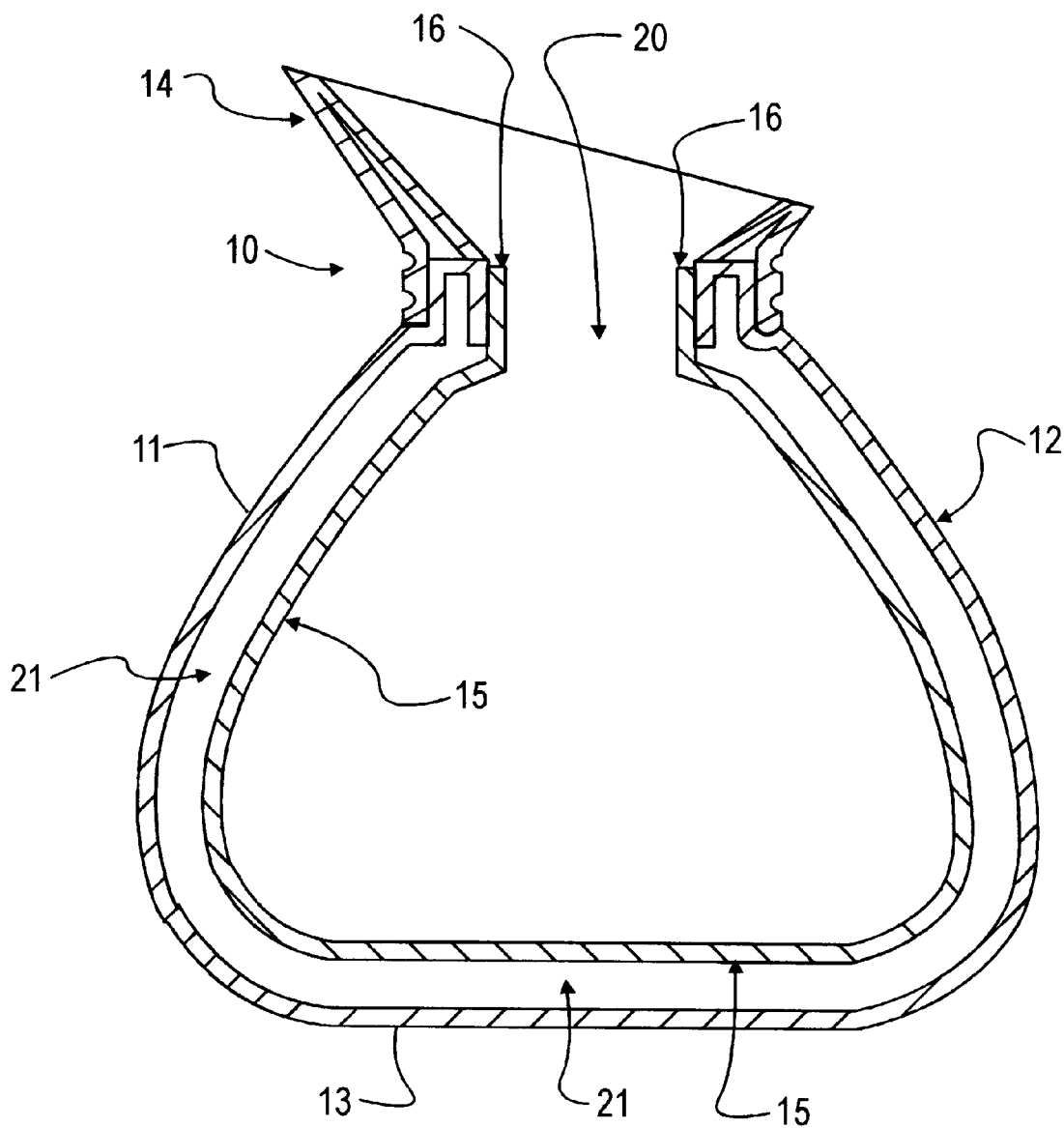

THERMAL COFFEE CARAFE

BACKGROUND OF THE INVENTION

This invention relates to thermal coffee carafe for maintaining the thermal energy of a fluid contained within the carafe. The carafe has a heat resistant outer shell capable of resting on a conventional coffee maker appliance's heat generation surface without any deformation of the carafe. The outer shell has a spout opening for pouring at its top and is of a shape similar to the appliance's factory supplied carafe. This shape allows the thermal carafe of this invention to fit on the heat generation surface of the appliance in place of the factory supplied carafe. The carafe will also has an interior globe which only comes in contact with the outer shell at the spout opening. The interior globe is the portion of the carafe that holds warm liquids such as coffee. The cavity between the outer shell and the interior globe provides insulation to the contained liquids. The cavity is either evacuated to a lower pressure than atmospheric, contains an insulator such as an aerogel, or contains an insulator such as aerogel and is also evacuated. The carafe has an insulated cover for the spout opening.

PRIOR ART

Heretofore, coffee carafes were either capable of withstanding the heat of a coffee maker appliance's heat generation surface or the prior art carafes were made insulated so that they could be placed on a serving table without a loss of heat. The prior art carafes which were capable of withstanding a coffee maker appliance's heat generation surface transferred the energy from the heat generation surface to the liquid contained within. While in the short term these prior art carafes and coffee makers maintained the thermal energy within the coffee, there were longer term negative effects to the taste of the coffee contained within. The heat of the coffee maker heat generation surface would cause a slow but steady evaporation process of the coffee. This concentration of the coffee results in degradation of the taste of the coffee. Such prior art coffee carafes are shown in U.S. Pat. Nos. 4,879,146; 5,108,808; and 5,215,794.

The second type of prior art coffee pots were insulated so that the liquid contained within would maintain its thermal energy. In other words, the coffee would stay warm. These insulated thermos carafes could be placed on a table for ease of serving. The prior art thermos carafes are practical for home use however the need to have a thermos for each table in commercial restaurant setting makes the thermos carafes economically impractical. The prior art thermos carafes were not capable of withstanding the heat of a warming burner of a coffee maker appliance. If these prior art thermos carafes were placed on a heat generation surface of a convention coffee maker or a stove the carafes outer surface would melt or severely deform. Additionally, these prior art thermal carafes were opaque. A user would have to open the top to determine the amount of liquid contained and thereby cause a loss of thermal energy from the liquid. A prior art thermos type coffee carafe is shown in U.S. Pat. No. 4,721,214.

There is a need for a thermal coffee carafe which may be placed on a heat generation surface of a conventional coffee maker without suffering deformation but still prevent the deleterious affects on coffee held within of prolonged warming on the heat generation surface. To date, however, a thermal coffee carafe having these properties has not been proposed.

SUMMARY OF THE INVENTION

Accordingly, a first object of the apparatus of the present invention is to provide a thermal coffee carafe which may be placed on a heat generation surface of a conventional coffee maker without suffering deformation.

A second object of the invention is to provide a thermal coffee carafe which will prevent the deleterious affects on coffee held within of prolonged warming on the heat generation surface.

A third object of the invention is to provide a transparent thermal coffee carafe which will allow level determination without causing a loss of thermal energy of a contained liquid.

The first and second objects of invention will be satisfied by a thermal coffee carafe having a heat resistant outer shell capable of resting on a conventional coffee maker appliance's heat generation surface without any deformation of the carafe. The outer shell will be of a shape similar to the appliance's factory supplied carafe so that the carafe of this invention may fit on the heat generation surface of the appliance in place of the factory supplied carafe. The carafe will also have an interior globe which will only come in contact with the outer shell at a pouring spout. The interior globe is the portion of the carafe that holds warm liquids such as coffee. The cavity between the outer shell and the interior globe will provide insulation to the contained liquids. The cavity will be evacuated to a lower pressure than atmospheric or will contain an insulator such as a silica aerogel. Aerogels are transparent low density solids with excellent insulation characteristics or will have an insulator and also be evacuated in the areas adjacent to the insulator.

The outer shell will be constructed of a heat resistant material such as a heat resistant glass or the heat resistant plastics: polyetherimide, polysolphone, and polycarbonate. In the preferred embodiment the heat resistant material of the outer shell will be polyetherimide which is commercially sold under the trade name Ultem®. The liquified precursors to the areogel insulator are poured in between the outer shell and the interior globe and the entire unit is heated under known conditions to transform the precursor substances to the silica aerogel. The outer shell and interior globe may be made of transparent materials so that a user may easily tell the volume of coffee within. The aerogel's transparent property facilitates having a transparent insulated coffee carafe.

BRIEF DESCRIPTION OF THE DRAWINGS

Other objects and advantages of the invention will become more apparent upon perusal of the detailed description thereof and upon inspection of the drawings in which:

FIG. 1 is an exploded perspective view of a thermal coffee carafe made in accordance with this invention.

FIG. 2 is a cut away side view of the thermal coffee carafe of FIG. 1.

DESCRIPTION OF THE PREFERRED EMBODIMENT

Referring now to the drawings in greater detail there is illustrated, in FIGS. 1 and 2, a thermal coffee carafe 10 for maintaining thermal energy of a contained liquid and capable of withstanding the heat associated with a heat generation surface 31 (not shown) of a conventional coffee maker 30 (not shown) made in accordance with this invention. The thermal coffee carafe 10 is generally comprised of: an outer shell 11; a pouring spout 14; an interior globe 15; a lid 18; and a handle 19.

The outer shell 11 is comprised of a generally spherical body 12 and a base 13 which are integral to one another. The body 12 is described as generally spherical because of the existence of the base 13 and a pouring opening 20 in an upper portion opposite the base 13. The outer shell 11 is constructed of a heat resistant material capable of withstanding up to three hundred seventy five degrees Fahrenheit (375° F.). The requirement of being able to withstand 375° F. is so that the outer shell 11, especially the base 13, can be placed on an energized heat generation surface 31 (not shown) of a convention coffee maker 30 (not shown) without suffering any degradation or deformation due to the heat. The base 13 is shaped to allow placement on the heat generation surface 31 in place of a factory supplied carafe 32 (not shown). The outer shell 11 is formed by a extrusion blow molding method known in the prior art. The heat resistant material may be a tempered glass such as Pyrex® or a heat resistant plastic such as polyetherimide, polysolphone, or polycarbonate. The thickness of the outer shell 11 should preferably be from 0.11 to 0.17 inches due to insulation design constraints for the thermal coffee carafe 10 as will be described below. The preferred heat resistant material for the outer shell 11 is a polyetherimide commercially sold as Ultem® 1000 polyetherimide resin.

The interior globe 15 is contained within the outer shell 11. The interior globe 15 is constructed of FDA approved food grade materials and may also be blow molded. The food grade materials may be transparent. The interior globe 15 is only connected to the outer shell 11 at the pouring opening 20 at location 16. Ultra-sonic bonding or a bonding adhesive 25 (not shown) such as an epoxy is used to connect the outer shell 11 to the interior globe 15. There is an insulating cavity 21 between the outer shell 11 and the interior globe 15. The cavity 21 provides an insulating barrier to restrict heat transfer from the outer shell 11 to the interior globe 15 and any liquids contained within the interior globe 15. The cavity 21 also provides an insulating barrier to restrict heat transfer from a liquid contained within the interior globe 15 to the outer shell 11 or the surrounding environment. The cavity 21 may be evacuated to a pressure less than atmospheric pressure, or filled with an insulating material 23 (not shown) which can include but is not limited to insulating foams, gels, fibers or other monolithic or particulate structures capable of restricting heat transfer, or partially filled with an insulating material 23 and evacuated in areas adjacent to the insulating material 23. If the cavity 21 is evacuated to a pressure less than atmospheric pressure, the preferred pressure is approximately 0.1 atmospheres gauge.

Attached to the outer shell 11 at the pouring opening 20 is a pouring spout 14. The pouring spout 14 is shaped to allow liquids to be poured from the thermal coffee carafe 10. The pouring spout 14 may be an integral part of the outer shell 11 or a separate component. An insulated lid 18 is engageable to the pouring spout 14 to provide a fully enclose any liquids in the interior globe 15. The lid 18 may be opened to allow replenishment of coffee to the interior globe 15. A handle 19 is engaged to the outer shell 11 to allow a user to easily hold the thermal coffee carafe 10.

The preferred insulating material 23 for filling the cavity 21 is an aerogel. The preferred aerogel is a silica aerogel also known as amorphous silica or silicon dioxide. Aerogels are an excellent material for this application due to their light weight, transparency and excellent insulating properties. The outer shell 11 and interior globe 15 may transparent. Use of areogel as the insulating material 23 in the cavity 21 will allow a waiter in a restaurant to visually determine the amount of coffee in the thermal coffee carafe 10 without disturbing the insulating barrier and thereby causing a heat loss.

The thickness of the outer shell 11 and the interior globe 15 are preferably in a range from 0.11 to 0.17 inches. These thickness ranges allow enough material to maintain the reduced pressure or the heated aerogel while limiting the amount of material used for economic reasons.

The thermal coffee carafe 10 may be manufactured as follows. The outer shell 11 and the interior globe 15 are separately extrusion blow molded. The outer shell 11 is then cut in half. The two pieces of the outer shell 11 are then rejoined with the interior globe 15 being placed inside. The outer shell 11 is connected to the interior globe at location 16 by use of ultra-sonic bonding or a known epoxy adhesive 25. A process opening 24 (not shown) along location 16 allows evacuation of the cavity 21 or back filling of an insulating material 23. The process opening 24 is closed when the cavity 21 is evacuated to the proper pressure for the evacuated embodiment of the invention. When the insulating material is a silica aerogel, the liquid precursors of the aerogel are poured into the cavity 21 through the process opening 24. The outer shell 11, interior globe 15 and the aerogel insulating material 23 are heated to form the aerogel. Following formation of the aerogel, the process opening 24 is closed via ultra-sonic bonding or the adhesive 25. The pouring spout 14, the handle 19, and the lid 18 are then connected to form an embodiment of the thermal coffee carafe 10 of this invention.

As described above the thermal coffee carafe 10 of the present invention provides a number of advantages, some of which have been described above, and others of which are inherent in the invention. Also, modifications may be proposed to the thermal coffee carafe 10 without departing from the teachings herein. Accordingly, the scope of the invention is only to be limited as necessitated by the accompanying claims.

What is claimed is:

1. A thermal coffee carafe for maintaining the thermal energy of a contained liquid and capable of withstanding the heat associated with a heat generation surface of a conventional coffee maker, comprising:
   (a) an outer shell constructed of a heat resistant material capable of withstanding up to 375 degrees Fahrenheit;
   (b) said outer shell having a generally spherical body and a base shaped to allow placement on the heat generation surface of the coffee maker;
   (c) said body of said outer shell having a pouring spout;
   (d) an interior globe, contained within said outer shell and joined to said outer shell at said pouring spout;
   (e) a cavity providing insulation between said outer shell and said interior globe;
   (f) a lid engageable to said outer shell to close said pouring spout;
   (g) a handle engaged to said outer shell; and
   (h) said heat resistant material is polyetherimide.

2. The thermal coffee carafe of claim 1, wherein:
   (a) said body of said outer shell is from 0.11 to 0.17 inches thick.

3. The thermal coffee carafe of claim 2, wherein:
   (a) said cavity between said body of said outer shell and said interior globe is evacuated to a pressure below atmospheric pressure.

4. The thermal coffee carafe of claim 3, wherein:
   (a) said cavity is evacuated to a pressure of approximately 0.1 atmospheres gauge.

5. The thermal coffee carafe of claim 2, wherein:
   (a) said cavity between said body of said outer shell and said interior globe contains an aerogel insulator.

6. The thermal coffee carafe of claim 5, wherein:
(a) said aerogel insulator is silica aerogel.

7. The thermal coffee carafe of claim 2, wherein:
(a) said interior globe is from 0.11 to 0.17 inches thick.

8. The thermal coffee carafe of claim 7, wherein:
(a) said interior globe is made of a transparent material.

9. A thermal coffee carafe for maintaining the thermal energy of a contained liquid and capable of withstanding the heat associated with a heat generation surface of a conventional coffee maker, comprising:
(a) an outer shell constructed of a heat resistant material capable of withstanding up to 375 degrees Fahrenheit;
(b) said outer shell having a generally spherical body and a base shaped to allow placement on the heat generation surface of the coffee maker;
(c) said body of said outer shell having a pouring spout;
(d) an interior globe, contained within said outer shell and joined to said outer shell at said pouring spout;
(e) a cavity providing insulation between said outer shell and said interior globe;
(f) a lid engageable to said outer shell to close said pouring spout;
(g) a handle engaged to said outer shell; and
(h) said heat resistant material is polysulfone.

10. The thermal coffee carafe of claim 9, wherein:
(a) said cavity between said body of said outer shell and said interior globe is evacuated to a pressure below atmospheric pressure.

11. The thermal coffee carafe of claim 10, wherein:
(a) said cavity is evacuated to a pressure of approximately 0.1 atmospheres gauge.

12. The thermal coffee carafe of claim 9, wherein:
(a) said cavity between said body of said outer shell and said interior globe contains an aerogel insulator.

13. The thermal coffee carafe of claim 12, wherein:
(a) said aerogel insulator is silica aerogel.

14. A thermal coffee carafe for maintaining the thermal energy of a contained liquid and capable of withstanding the heat associated with a heat generation surface of a conventional coffee maker, comprising:
(a) an outer shell constructed of a heat resistant material capable of withstanding up to 375 degrees Fahrenheit;
(b) said outer shell having a generally spherical body and a base shaped to allow placement on the heat generation surface of the coffee maker;
(c) said body of said outer shell having a pouring spout;
(d) an interior globe, contained within said outer shell and joined to said outer shell at said pouring spout;
(e) a cavity providing insulation between said outer shell and said interior globe;
(f) a lid engageable to said outer shell to close said pouring spout;
(g) a handle engaged to said outer shell; and
(h) said heat resistant material is polycarbonate.

15. The thermal coffee carafe of claim 14, wherein:
(a) said cavity between said body of said outer shell and said interior globe is evacuated to a pressure below atmospheric pressure.

16. The thermal coffee carafe of claim 15, wherein:
(a) said cavity is evacuated to a pressure of approximately 0.1 atmospheres gauge.

17. The thermal coffee carafe of claim 14, wherein:
(a) said cavity between said body of said outer shell and said interior globe contains an aerogel insulator.

18. The thermal coffee carafe of claim 17, wherein:
(a) said aerogel insulator is silica aerogel.

19. A thermal coffee carafe for maintaining the thermal energy of a contained liquid and capable of withstanding the heat associated with a heat generation surface of a conventional coffee maker, comprising:
(a) an outer shell constructed of a heat resistant material capable of withstanding up to 375 degrees Fahrenheit;
(b) said outer shell having a base shaped to allow placement on the heat generation surface of the coffee maker;
(c) said body of said outer shell having a pouring spout;
(d) an interior globe, contained within said outer shell and joined to said outer shell at said pouring spout;
(e) a cavity providing insulation between said outer shell and said interior globe;
(f) a lid engageable to said outer shell to close said pouring spout;
(g) a handle engaged to said outer shell; and
(h) said heat resistant material is a heat resistant glass.

20. The thermal coffee carafe of claim 19, wherein:
(a) said cavity between said body of said outer shell and said interior globe is evacuated to a pressure below atmospheric pressure.

21. The thermal coffee carafe of claim 20, wherein:
(a) said cavity is evacuated to a pressure of approximately 0.1 atmospheres gauge.

22. The thermal coffee carafe of claim 19, wherein:
(a) said cavity between said body of said outer shell and said interior globe contains an aerogel insulator.

* * * * *